Feb. 4, 1947.  L. F. DONNER  2,415,342
APPARATUS FOR USE IN LEARNING READING AND ARITHMETIC
Filed Nov. 3, 1944  3 Sheets-Sheet 1
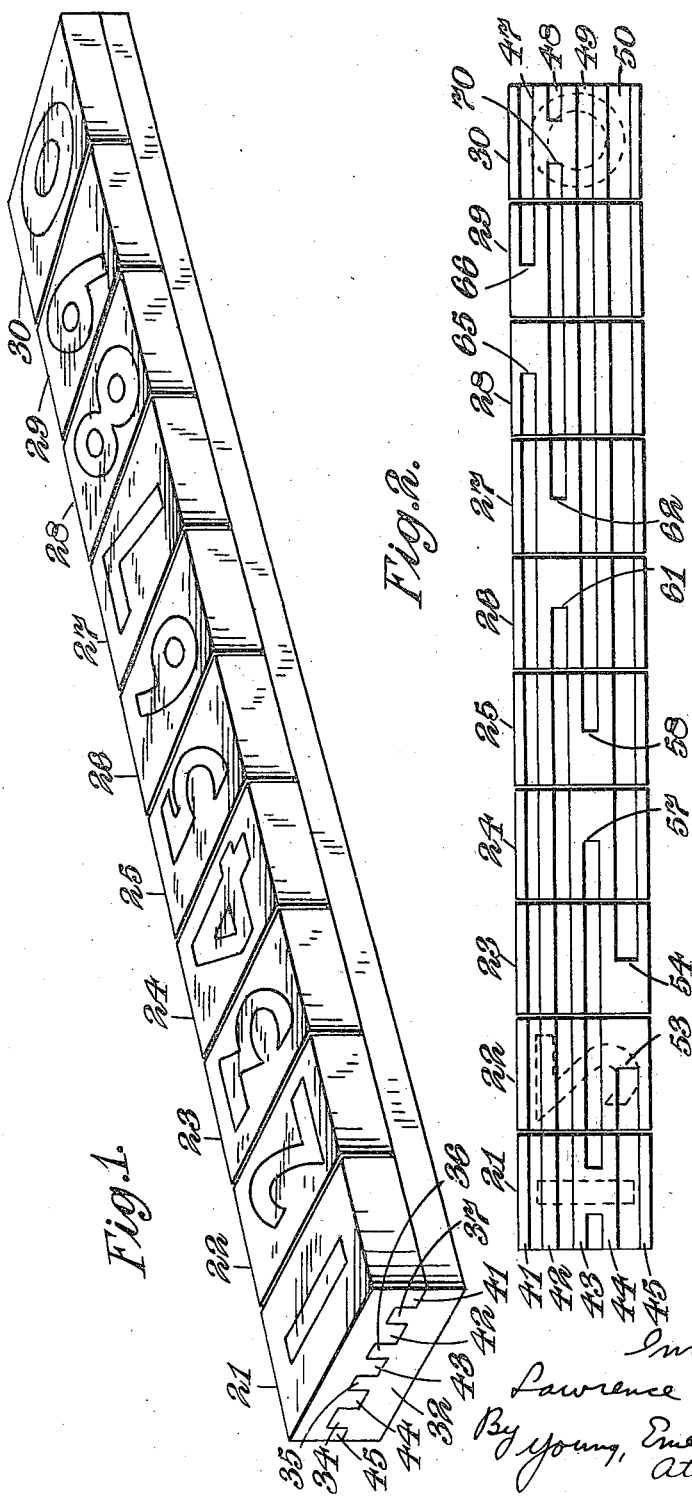

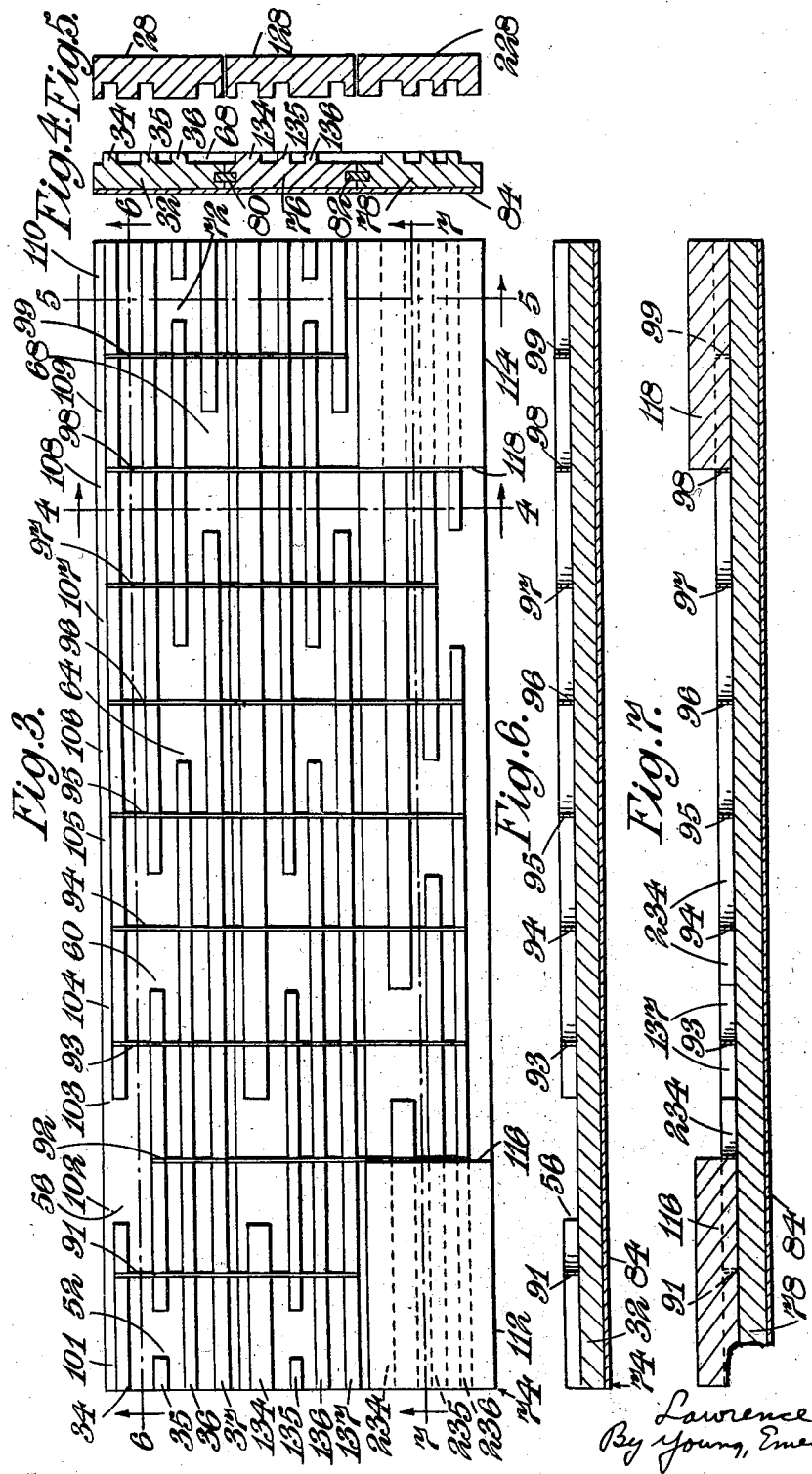

Feb. 4, 1947. L. F. DONNER 2,415,342
APPARATUS FOR USE IN LEARNING READING AND ARITHMETIC
Filed Nov. 3, 1944 3 Sheets-Sheet 3
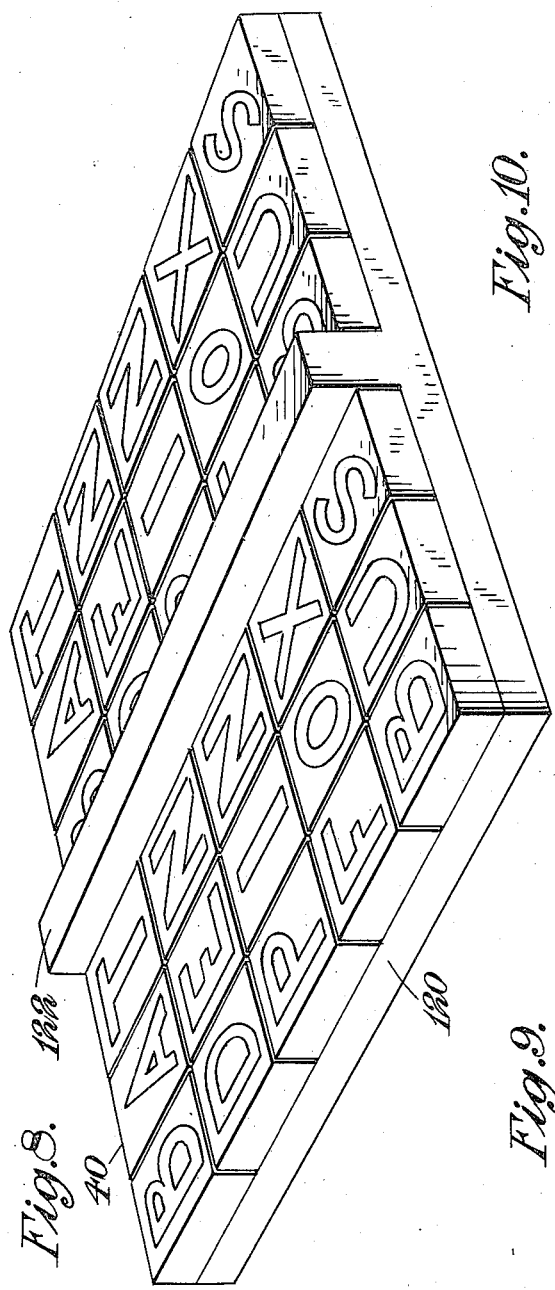
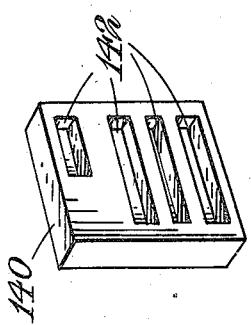
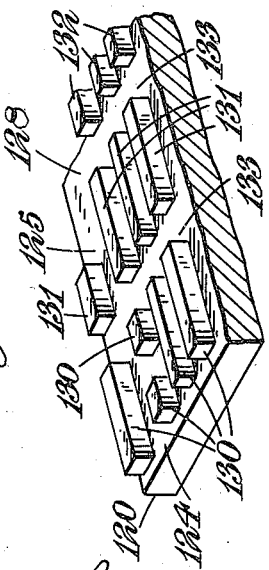

Patented Feb. 4, 1947

2,415,342

UNITED STATES PATENT OFFICE 2,415,342

APPARATUS FOR USE IN LEARNING READING AND ARITHMETIC

Lawrence Frederick Donner, London, England

Application November 3, 1944, Serial No. 561,726
In Great Britain October 21, 1943

20 Claims. (Cl. 35—69)

This invention relates to educational apparatus, and apparatus for playing a game, of the kind comprising bricks, blocks or like pieces, each bearing a numeral, letter of the alphabet or other character, particularly for use by young people and others to facilitate the learning of numbers, letters of the alphabet and other purposes, such as a game of word-making. These bricks, blocks or like pieces, each bearing character, will hereinafter be referred to generally as bricks. The invention is concerned with educational, games and like apparatus of the type (hereinafter referred to as the type described) comprising a plurality of bricks each of four-cornered shape, each having on one face a numeral, letter of the alphabet or other character, and each formed or provided with one or more projections or with one or more recesses for use in assembling the bricks in one or more rows to form numbers, when the bricks carry numerals, or to form words, when the bricks carry letters of the alphabet.

It has heretofore been proposed to provide apparatus of the type described, in which each brick had a plurality of lateral dovetailed projections and corresponding grooves for interlinking the bricks side by side to provide a word or words; in this earlier construction each brick was similar to every other brick, except for its marking, so that they could also readily be assembled side by side in a row in such a manner that the letters on them did not form words, but were jumbled.

The present invention has for its main object to provide an improved construction of apparatus of the type described, to assist children in learning to count, as from one to ten or any other consecutive series of numbers, and in learning the letters of the alphabet in the correct order, and in learning to read words, and arranging letters in the correct order to form words.

According to the invention there is provided educational and other apparatus of the type described comprising a plurality of members that lie or are arranged to lie one against another, some or all of which members constitute bricks having characters on their upper faces, two faces of which members that are adjacent or are to be adjacent one to another are formed respectively with one or more projections in the form of ribs, and with one or more corresponding recesses in the form of grooves, which co-operating projections and recesses of one pair of members differ in arrangement, shape, or size from those of another pair so that the bricks, when assembled, will lie only in one predetermined order in relation one to another.

A plurality of bricks having characters on their upper faces constituting each a male member may be arranged to co-operate with various parts of a female member common to all the bricks.

Alternatively, a plurality of bricks having characters on their upper faces constituting each a female member may be arranged to co-operate with various parts of a male member common to all the bricks.

Conveniently, the male or female base member for use with a plurality of bricks having characters on their upper faces has the form of a bar whereof its top face has respectively a plurality of ribs or grooves, and is divided in the direction of its length into a plurality of fields or squares arranged in a row each for receiving a piece having grooves or ribs respectively at its underside, at least one rib or groove in each of which field is blanked off to make it shorter than one or more other ribs or grooves in the same field, the blanked off portions of which ribs or grooves differ in position and/or size in the various fields.

In some cases at least one rib or one groove in each field is narrower than one or more ribs or grooves respectively in the same field, and the position of such narrower rib or groove in one field differs from that of a narrower rib or groove respectively in another field.

A plurality of rows of fields may be arranged side by side on a base member common to them all, and each field in a row may differ as to its projections and/or recesses from all the other fields in the same row and one or more other rows.

An end field in a row may have continuous ribs and continuous grooves between the same, which end field may serve for mating with a blank member.

The invention also provides apparatus as set forth for use with an alphabet of twenty-six letters, wherein two rows have each ten fields, and a third row has six fields.

In one convenient construction a base member has its upper face divided by one or more dividing members or partition walls into two or more areas each comprising a plurality of rows of fields arranged in parallel relation.

Several embodiments of the invention are diagrammatically illustrated by way of example in the accompanying drawings, wherein:

Figure 1 is a perspective view showing one construction of apparatus according to the invention comprising a row of lettered bricks on a base member, and Figure 2 is a plan view of the underside of the row of bricks when removed from the base member;

Figure 3 is a plan view of a base member of another construction of apparatus according to the invention comprising a plurality of rows of bricks;

Figure 4 is a vertical transverse section taken on the line 4—4 in Figure 3;

Figure 5 is a like section taken on the same line through bricks (not shown in Figure 3) to be mated with the base member at that situation, and Figures 6 and 7 are longitudinal vertical sections taken on the lines 6—6 and 7—7, respectively in Figure 3;

Figure 8 is a perspective view of a third construction of apparatus according to the invention comprising a base member divided into two areas each carrying bricks;

Figure 9 is a detail perspective view showing part of the base member, and

Figure 10 shows one brick in perspective.

Like reference characters designate like parts throughout the several views.

Referring first to Figures 1 and 2, one form of educational apparatus of the type described, designated generally 20, comprises ten square bricks 21 to 30 for use with a base member 32 which constitutes a female member and is a rectangular bar. This bar 32 has in its top face five continuous longitudinal recesses or grooves whereof the two outer ones are rabbets. These grooves form four ribs 34, 35, 36 and 37, two of which 34 and 37 lie near opposite sides of the bar. This grooved face is divided longitudinally into ten square fields, one for each brick, by nine division lines marked on it, or by nine transverse thin strips of metal or other convenient material let into saw cuts in the bar, as described hereinafter with reference to Figures 3 to 7. In each field a part of one rib is removed so as to blank off part of the same, and corresponding parts of the bricks have the grooves blanked by solid material; each field and its allotted brick have cooperating projections and grooves which are arranged differently from the other fields and their allotted bricks, in order that the bricks can be assembled only in one predetermined order in relation one to another.

The bricks 21 to 30 taken together are equal in area at their underside to the total area of the fields, and they are preferably the same thickness as the bar 32. Each brick is a male member and has on its bottom face a plurality of projections in the form of tongues or ribs so arranged that each brick is a counterpart of one of the fields. As shown in Figure 2, the underside of the row of bricks arranged in correct numerical order is formed with five longitudinal projections in the form of ribs or tongues 41, 42, 43, 44, 45 corresponding to the five grooves in the bar 32. These ribs, apart from the divisions between the bricks, are all continuous, but the four grooves 47, 48, 49, 50 between them are discontinuous. In the end brick 21, the groove 49 is blanked off by material at 51 to enter into a gap at 52 in the rib 35 shown in Figure 3. In the bricks 22 and 23, the groove 50 is blanked off by material at 53 and 54, respectively, to enter a gap at 56 in the rib 34. In the bricks 24 and 25, the groove 49 is blanked off by material at 57 and 58, respectively, to enter a gap at 60 in the rib 35. In the bricks 26 and 27, the groove 48 is blanked off by material at 61 and 62, respectively, to enter a gap at 64 in the rib 36. In the bricks 28 and 29, the groove 47 is blanked off by material at 65 and 66, respectively, to enter a gap at 68 in the rib 37. In the end brick 30, the groove 48 is blanked off by material 70 to enter a gap at 72 in the rib 36. Consequently when all the ten bricks are placed level on the bar 32 with their projections entered into the recesses they must lie in a predetermined order, in which numerals 1 to 9 and 0 will be in the correct order. If letters of the alphabet e. g. A to J, are marked on the bricks instead of numerals they also will be in the correct order. By using the described apparatus in this way a child may be assisted in learning numbers and letters of the alphabet.

The apparatus shown in Figures 3 to 7 is intended particularly for use with bricks having letters of the alphabet marked on their top faces arranged in order on a base member designated generally 74. This base member is a female member which comprises three bars 32, 76 and 78 joined together side by side in any convenient manner, as by two tenon and mortice 80, 82, and it may have at the bottom a layer of fabric 84, such as baize, or the like. The bar 32 and the bricks to be used with it have been described above with reference to Figure 1. The bar 76 is similar to the bar 32, but differs therefrom in that, as is apparent particularly from Figure 4, the width of its rib 134 differs slightly from the width of the corresponding rib 34, while its ribs 135, 136 and 137 substantially correspond in width to the ribs 35, 36 and 37, respectively. The bar 78 is similar to the bar 76, but differs therefrom in that it has only three ribs 234, 235 and 236, and has no rib corresponding to the rib 137 of the bar 76. It is apparent in Figure 3 that gaps in the ribs of the two bars 76 and 78 differ in position, and also differ in position from the gaps in the ribs of the bar 32.

The bricks for use with the bars 76 and 78 are male members and have projections in the form of ribs or tongues for entering into the recesses of those bars, as well as recesses in the form of grooves for receiving parts of the projections of the bars. Two such bricks 128 and 228, corresponding in position to the brick 28, for use with the bars 76 and 78, respectively, are shown in cross-section in Figure 5. These two bricks 128, 228, and also all the other bricks for use with the bars 76 and 78 have each a groove blanked off with solid material to enter a gap in a rib of the respective field on which the brick is to be placed in its correct position on the base member 74.

The fields are defined by nine thin transverse strips 91 to 99 of metal or other convenient material let into saw-cuts in the ribs of the base member, which strips prevent bricks on the bars from being slid along a bar from one field to the next in both directions. The ten fields of the bar 28 defined in this manner are designated 101 to 110 in Figure 3.

As there are only twenty-six letters of the English alphabet, and the two bars 32 and 76 have each ten fields for twenty lettered bricks, the bar 78 need have only six fields for six lettered bricks. Consequently, as shown in Figures 3 and 7, the two strips 91 and 99 need not extend across the bar 78, so that this bar has at its ends larger spaces 112 and 114, in which the grooves and ribs are continuous, for receiving two oblong unlettered members 116 and 118, respectively, each equal in size to two of the lettered bricks. These blank members 116, 118 have at their underside continuous ribs and grooves for co-operating with the grooves and ribs, respectively, of the two larger spaces 112, 114, the area of each of which is substantially equal to the area of two of the square fields. Preferably these blank members 116 and 118 are fixed in position, e. g. detachably, on the base member 74, to ensure that no lettered brick can be improperly placed on either of the spaces 112 and 114.

It will be appreciated that as the male and female members each has projections and recesses, the base member 74 described above as a female member may be regarded as a male member, in which case the bricks will be regarded as co-operating female members.

It will be observed from Figure 3 that the ribs 134 and 234 are shown wider than the other ribs, and the grooves between some of the ribs are shown wider than those between other ribs. In this way provision is made for a large number of possible combinations of dissimilar projections and recesses of the co-operating male and female members.

Referring now to Figures 8 to 10 showing a word-building apparatus of the type described, a male base member 120 has a short middle upstanding partition wall 122 dividing its top face into two equal areas, each comprising fifteen fields arranged in five rows, with three fields in each row. Two of these fields and part of a third are shown at 124, 126 and 128 in Figure 9. Projections or ribs 130, 131 and 132 of the fields 124, 126 and 128, respectively, correspond in arrangement to the rigs of the fields 101, 102 and 103 shown in Figure 3, but differ therefrom in that they do not extend to the outside edge of the base member, and are divided in the direction of their length at the margins of the fields not by strips, but by spaces as shown at 133. The bricks constituting female members to be used with each area of the base member are lettered to form three-letter words, and each has recesses in its underside to correspond with the projections of the correct field on which it is intended to be placed. The brick 140 shown in Figure 10, for example, corresponds to the brick 22 shown in Figure 1, and has recesses 142 to receive the ribs 131 of the field 125 shown in Figure 9. It will be seen that the middle letters of the five rows of bricks at opposite sides of the partition wall 122 are the five vowels arranged in their correct order. Obviously the words at one side of the wall 122 may differ from those at the opposite side if desired. Also the bricks may bear numerals instead of letters. Further base members may have only one area divided into fields, or more than two such areas with partitions or the like between them.

In some cases, some of the grooves may be made narrower than others to provide for a large number of possible combinations of projections and recesses.

In order that the projections on one brick may differ from those on another, one or more of such projections on one side of a brick may differ in size or shape, or in both size and shape from one or more others on the same side of the same brick.

The bricks and also the base members may be made of any convenient material, e. g. wood, metal or any convenient moulded substances, such as plastic.

The described constructions of apparatus are also adapted for use in playing a game and for amusement purposes, although they are primarily intended for educational purposes.

Various modifications may be made in the details of construction described above without departing from the invention. For example, the letters, numerals or other characters on the bricks may be applied to them either directly, as by painting or printing or embossing, or by means of a panel affixed to them. Also each brick may be of a different colour from one or more others, or in one apparatus all the bricks may be of the same colour. Further, when the base member 74 shown in Figure 3 is moulded the strips of metal may be substituted by moulded portions.

I claim:

1. Apparatus of the type described comprising a base member and a plurality of bricks having characters on their upper faces arranged to lie thereon, the top face of which base member has a plurality of projections in the form of ribs, and is divided in the direction of its length into a plurality of rows of fields arranged side by side, each of which bricks has in its under side recesses in the form of grooves, and is allotted to one of the fields, the co-operating recesses and projections of one brick and its field differing from those of each other brick and its allotted field, so that the bricks are adapted to lie only in one predetermined order in relation one to another on the base member.

2. Apparatus of the type described comprising a base member and a plurality of bricks having characters on their upper faces arranged to lie thereon, the top face of which base member has a plurality of recesses in the form of grooves, and is divided in the direction of its length into a plurality of rows of fields arranged side by side, each of which bricks has on its underside projections in the form of ribs, and is allotted to one of the fields, the co-operating projections and recesses of one brick and its field differing from those of each other brick and its allotted field, so that the bricks are adapted to lie only in one predetermined order in relation one to another on the base member.

3. Apparatus as set forth in claim 1, wherein each field in a row differs as to its projections from all the other fields in the same row and from the field of any other rows.

4. Educational or other apparatus of the type described, comprising in combination a base member, and a plurality of members having characters on their upper faces, each constituting a brick, that are adapted to lie beside one another directly on parts of the top face of the base member, which top face of the base member and underside of the bricks are formed one with a plurality of parallel ribs and the other with a plurality of corresponding parallel grooves, which cooperating ribs and grooves of a pair of faces constituted by the underside of a brick and a part of the top face of the base member, on which the brick is placed, differ in shape from those of another pair of such faces.

5. Educational or other apparatus of the type described, comprising in combination a male base member in the form of a bar, and a plurality of members having characters on their upper faces, each constituting a brick, that are adapted to lie beside one another directly on parts of the top face of the bar, the top face of which bar and the bottom faces of which bricks are formed respectively with ribs extending in the direction of length of the bar, and with corresponding grooves, which cooperating grooves and ribs of a pair of faces constituted respectively by the underside of a brick and a part of the top face of the bar on which the brick is placed, differ from those of any other pair of such faces, the top face of said bar being divided in the direction of its length into a plurality of fields or squares arranged in a row each for receiving a said brick, at least one rib and groove in each of which pairs of faces being blanked off to make them shorter than one or more other ribs and grooves respectively, in the same pair of faces, the blanked off portions of said ribs and grooves differing in the various pairs of faces.

6. Educational or other apparatus of the type described, comprising in combination a female base member in the form of a bar, and a plurality of members having characters on their upper faces, each constituting a brick, that are adapted to lie beside one another directly on parts of the top face of the bar, the top face of which bar and the bottom faces of which bricks are formed respectively with grooves extending in the direction of length of the bar, and with one or more corresponding ribs, which cooperating ribs and grooves of a pair of faces constituted respectively by the underside of a brick and a part of the top face of the bar on which the brick is placed, differ from those of another pair of such faces, the top face of said bar being divided in the direction of its length into a plurality of fields or squares arranged in a row each for receiving a said brick, at least one rib and groove in each of which pairs of faces being blanked off to make them shorter than one or more outer ribs and grooves, respectively, in the same pair of faces, the blanked off portions of said ribs and grooves differing in the various pairs of faces.

7. Apparatus as set forth in claim 5, wherein a rib in one field differs in size from one or more other ribs in the same field.

8. Apparatus as set forth in claim 6, wherein a groove in one field differs in size from one or more other grooves in the same field.

9. Apparatus as set forth in claim 5, wherein the ribs differ in position in the various fields.

10. Apparatus as set forth in claim 6, wherein the grooves differ in position in the various fields.

11. Apparatus as set forth in claim 5, wherein at least one rib in each field is shorter than one or more ribs in the same field, and the position of such shorter rib in one field differs from that of a shorter rib in another field.

12. Apparatus as set forth in claim 6, wherein at least one groove in each field is shorter than one or more grooves in the same field, and the position of such shorter groove in one field differs from that of a shorter groove in another field.

13. Apparatus as set forth in claim 5, comprising a plurality of rows of fields comprising ribs arranged side by side on a male base member common to them all, and a plurality of bricks having grooves allotted each to one of the fields.

14. Apparatus as set forth in claim 6, comprising a plurality of rows of fields comprising grooves arranged side by side on a female base member common to them all, and a plurality of bricks having ribs allotted each to one of the fields.

15. Apparatus as set forth in claim 5, comprising a plurality of rows of ribbed fields arranged side by side on a male base member common to them all, and a plurality of bricks having grooves allotted each to one of the fields, wherein each field in a row differs as to its ribs from all the other fields in the same row and from the fields in one or more other rows.

16. Apparatus as set forth in claim 6, comprising a plurality of rows of grooved fields arranged side by side on a female base member common to them all, and a plurality of bricks having ribs allotted each to one of the fields, wherein each field in a row differs as to its grooves from all the other fields in the same row, and from the fields in one or more other rows.

17. Apparatus as set forth in claim 5, comprising a plurality of bars each having a row of fields joined together side by side to form a single base member, and a plurality of bricks allotted each to one of the fields.

18. Apparatus as set forth in claim 5, comprising a plurality of rows of fields arranged side by side on a base member common to them all, and a plurality of bricks each marked with a letter of the alphabet allotted each to one of the fields and adapted to lie in alphabetical order on the base member.

19. Apparatus as set forth in claim 4, characterized in that each of said members has a letter of the alphabet on its upper face.

20. Apparatus as set forth in claim 4, characterized in that each of said members has a numeral on its upper face.

LAWRENCE FREDERICK DONNER.

REFERENCES CITED

The following references are of record in the file of this patent:

UNITED STATES PATENTS

| Number | Name | Date |
|---|---|---|
| 1,396,379 | Moore | Nov. 8, 1921 |
| 1,539,009 | Paris | June 2, 1925 |
| 1,836,851 | Kidd | Dec. 15, 1931 |
| 1,902,404 | Humphreys | Mar. 21, 1933 |
| 2,190,881 | Palmer | Feb. 20, 1940 |
| 1,856,650 | McLintock | May 3, 1932 |
| 723,425 | Thompson | Mar. 24, 1903 |
| 1,980,637 | Savory | Nov. 13, 1934 |
| 275,329 | Crandall | Apr. 3, 1883 |
| 1,230,263 | Alexander | June 19, 1917 |

FOREIGN PATENTS

| Number | Country | Date |
|---|---|---|
| 214,098 | British | 1924 |